United States Patent
Ishii et al.

(10) Patent No.: US 10,030,599 B2
(45) Date of Patent: Jul. 24, 2018

(54) VEHICLE CONTROL APPARATUS

(71) Applicant: TOYOTA JIDOSHA KABUSHIKI KAISHA, Toyota-shi, Aichi (JP)

(72) Inventors: Kenichi Ishii, Miyoshi (JP); Hiroto Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/305,255

(22) PCT Filed: May 22, 2015

(86) PCT No.: PCT/JP2015/065491
§ 371 (c)(1),
(2) Date: Oct. 19, 2016

(87) PCT Pub. No.: WO2015/190309
PCT Pub. Date: Dec. 17, 2015

(65) Prior Publication Data
US 2017/0107926 A1    Apr. 20, 2017

(30) Foreign Application Priority Data
Jun. 11, 2014 (JP) ................. 2014-120997

(51) Int. Cl.
*F02D 41/10* (2006.01)
*F02D 41/04* (2006.01)
*B60K 31/04* (2006.01)

(52) U.S. Cl.
CPC .......... *F02D 41/107* (2013.01); *B60K 31/042* (2013.01); *F02D 41/042* (2013.01); *F02D 2200/501* (2013.01)

(58) Field of Classification Search
CPC .......... F02N 11/0814; F02N 2200/125; F02D 41/107; F02D 41/042; F02D 2200/501
See application file for complete search history.

(56) References Cited

U.S. PATENT DOCUMENTS

| 7,664,589 B2 * | 2/2010 | Etori ................. B60W 30/17 180/170 |
| 2006/0142121 A1 | 6/2006 | Moriya |
| 2006/0212207 A1 * | 9/2006 | Sugano ............... B60W 10/06 701/93 |

(Continued)

FOREIGN PATENT DOCUMENTS

| JP | 2014-070531 A | 4/2014 |
| WO | 2007/098999 A1 | 9/2007 |

*Primary Examiner* — Stephen K Cronin
*Assistant Examiner* — Anthony L Bacon
(74) *Attorney, Agent, or Firm* — Oliff PLC

(57) ABSTRACT

A vehicle control apparatus is provided that can maintain an automatic engine stop function when an abnormality occurs in a preceding vehicle following control function. The vehicle control apparatus includes a first control unit configured to include a preceding vehicle following control function to control vehicle speed, based on a traveling state of a preceding vehicle, and to output a prohibition request to an automatic engine stop function; and a second control unit configured to include the automatic engine stop function, and to maintain the automatic engine stop function, contrary to the prohibition request output from the first control unit, when an abnormality occurs in the preceding vehicle following control function.

2 Claims, 4 Drawing Sheets

(56) References Cited

U.S. PATENT DOCUMENTS

2012/0016573 A1    1/2012  Ellis
2012/0191317 A1*  7/2012  Mueller-Lerwe ....... B60T 7/042
                                              701/93
2016/0061172 A1*  3/2016  Sato ..................... B60W 30/16
                                              701/112

* cited by examiner

VEHICLE CONTROL APPARATUS

TECHNICAL FIELD

The disclosures herein generally relate to a vehicle control apparatus.

BACKGROUND ART

A vehicle control apparatus has been known that allows automatic stopping of an engine while ACC (Active Cruise Control) is operating if negative booster pressure becomes greater than or equal to a second predetermined value, which is greater than a first predetermined value (see, for example, Patent Document 1).

RELATED-ART DOCUMENTS

Patent Documents

[Patent Document 1] Japanese Laid-open Patent Publication NO. 2014-070531

SUMMARY OF THE INVENTION

Problem to be Solved by Invention

Incidentally, while an abnormality occurs in a preceding vehicle following control function such as ACC, if a control apparatus that implements a preceding vehicle following control function, outputs a prohibition request to an automatic engine stop function, the automatic engine stop function may be unnecessarily disturbed.

It is an object of the present invention to provide a vehicle control apparatus that can maintain the automatic engine stop function when an abnormality occurs in a preceding vehicle following control function.

Means to Solve the Problem

According to at least one embodiment of the present invention, a vehicle control apparatus includes a first control unit configured to include a preceding vehicle following control function to control vehicle speed, based on a traveling state of a preceding vehicle, and to output a prohibition request to an automatic engine stop function; and a second control unit configured to include the automatic engine stop function, and to maintain the automatic engine stop function, contrary to the prohibition request output from the first control unit, when an abnormality occurs in the preceding vehicle following control function.

Advantage of the Invention

According to at least one embodiment of the present invention, a vehicle control apparatus can be obtained that can maintain the automatic engine stop function when an abnormality occurs in the preceding vehicle following control function.

MODE FOR CARRYING OUT THE INVENTION

In the following, embodiments of the present invention will be described with reference to the drawings.

Figure 1:
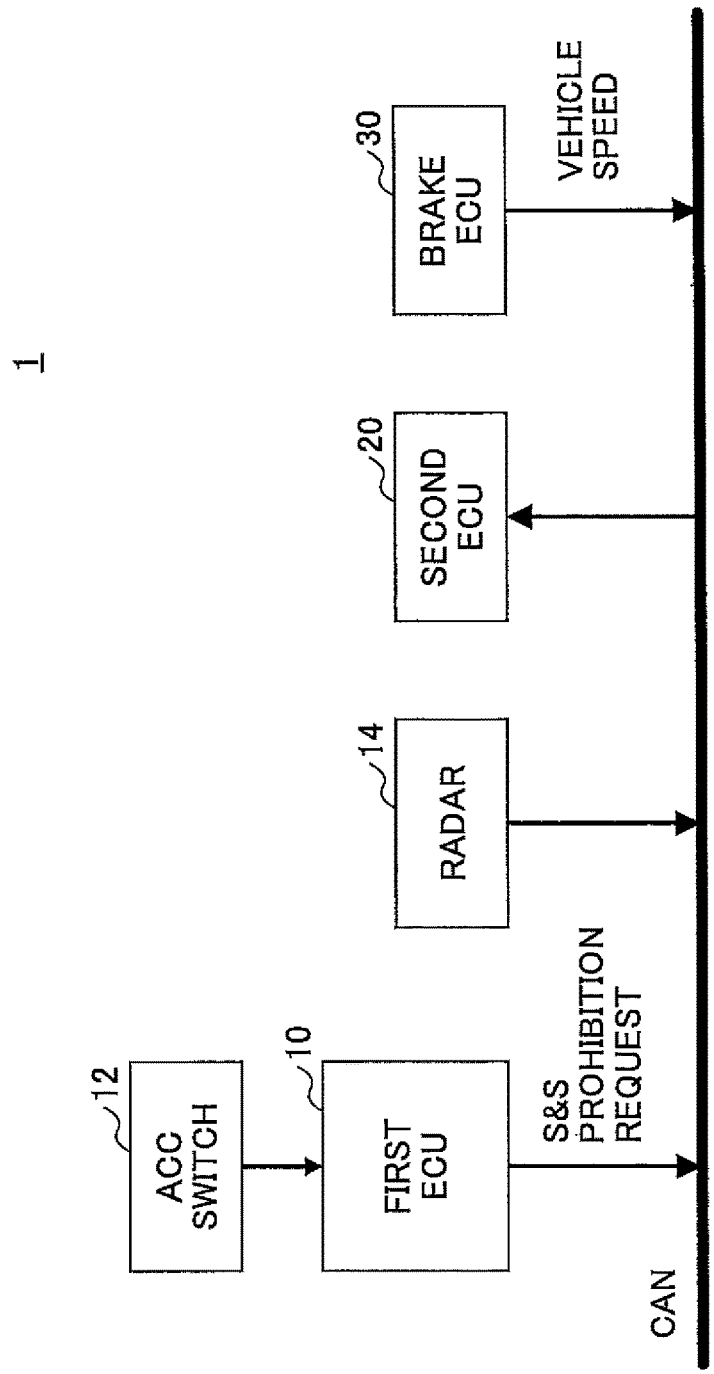
FIG. 1 is a diagram illustrating a basic configuration example of a vehicle control apparatus 1.

FIG. 1 is a diagram illustrating a basic configuration example of a vehicle control apparatus 1. The vehicle control apparatus 1 is built in a vehicle.

The vehicle control apparatus 1 includes a first ECU (Electronic Control Unit) 10, a second ECU 20, and a brake ECU 30. The first ECU 10, the second ECU 20 and the brake ECU 30 are connected with each other via an appropriate bus, for example, a CAN (controller area network).

The first ECU 10 includes a preceding vehicle following control function. The preceding vehicle following control function is represented by ACC, which may be arbitrarily named, and may be a control function similar to the ACC, for example, CACC (Cooperative Adaptive Cruise Control) or the like. Note that the preceding vehicle following control function may preferably be a function that operates while the vehicle speed is greater than or equal to 0 (for example, an all-inclusive speed range ACC). In the following, assume that the preceding vehicle following control function operates while the vehicle speed is greater than or equal to 0.

The first ECU 10 is connected with an ACC switch 12. The ACC switch 12 is built in a vehicle room (for example, on a steering column), and can be operated by a user. The ACC switch 12 may be a switch that is capable of operations such as turning on and off, resuming, speed setting (increasing speed or decreasing speed), and canceling, and may include a master switch.

The first ECU 10 is connected with a radar or the like that detects preceding vehicle information (relative distance, relative speed, and the like), using a sound wave (for example, a supersonic wave), a radio wave (for example, a millimeter wave), a light wave (for example, a laser), or the like. The radar 14 may be, for example, a laser radar, a millimeter-wave radar, or a supersonic radar. Also, instead of, or in addition to the radar 14, an image sensor may be used. The first ECU 10 executes the preceding vehicle following control function based on the preceding vehicle information obtained by the radar 14. The preceding vehicle following control function may include, for example, acceleration control, deceleration control, constant speed traveling control, and the like.

The second ECU 20 includes an automatic engine stop function. The automatic engine stop function may be an arbitrary function including an S&S (Stop & Start) or the like. The automatic engine stop function may be accompanied by an engine restart function.

Based on the vehicle speed information and the like, the second ECU 20 determines whether a predetermined S&S start condition is satisfied, and if determining that the predetermined S&S start condition is satisfied, the second ECU 20 has the automatic engine stop function operate. Having the automatic engine stop function operate includes stopping the engine. The S&S start condition includes a condition that the vehicle speed is less than or equal to a predetermined vehicle speed $V_{th}$ (referred to as the "E/G-stop vehicle speed $V_{th}$" below). The E/G-stop vehicle speed $V_{th}$ may be zero or a speed within a low vehicle speed region, for example, 13 km/h, or may be variable. Note that the S&S start condition may include other arbitrary conditions, for example, an open fault of the battery is not detected; the brake pedal is stepped on; the magnitude of booster negative pressure is greater than or equal to a predetermined value; states of charge (SOC) of air-conditioning and a battery; a road gradient and the like. Logical AND may be taken with these conditions.

The second ECU 20 determines whether the predetermined S&S end condition is satisfied, and if determining that the predetermined S&S end condition is satisfied, the second ECU 20 stops the operation of the automatic engine stop function. Stopping the automatic engine stop function includes starting the engine. Note that the predetermined S&S end condition may include arbitrary conditions. Typical conditions include, for example, that stepping on the brake pedal is released; the magnitude of booster negative pressure becomes less than a predetermined value; and others such as a state of air-conditioning (reduced air-conditioning comfort) or a state of the battery (reduced capacity).

The brake ECU 30 controls a brake actuator (not shown). The brake ECU 30 supplies vehicle speed information calculated based on wheel speed sensors (not shown) to the first ECU 10 and the second ECU 20, for example, via a CAN. Note that the first ECU 10 and/or the second ECU 20 may obtain the vehicle speed information from the other ECUs, or may directly obtain it based on a detection signal from the wheel speed sensors. Also, instead of, or in addition to the information from the wheel speed sensors, the first ECU 10 and/or the second ECU 20 may obtain the vehicle speed information from a change of the vehicle position from a GPS receiver, or the rotational speed of the output shaft of the transmission.

Figure 2:
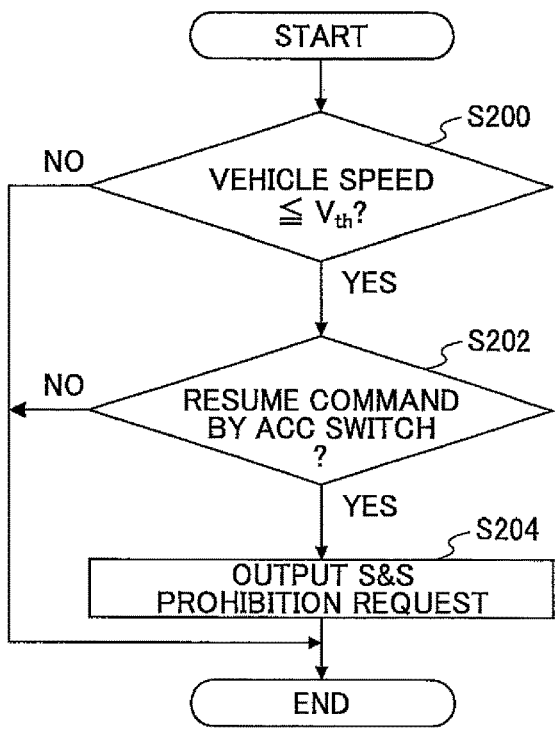
FIG. 2 is a flowchart illustrating an example of an S&S prohibition request generation process executed by a first ECU 10.

FIG. 2 is a flowchart illustrating an example of an S&S prohibition request generation process executed by the first ECU 10. The process illustrated in FIG. 2 may be repeatedly executed for predetermined cycles while the ACC switch of the vehicle is in an on state.

At Step S200, based on the latest vehicle speed information, the first ECU 10 determines whether the speed is less than or equal to the E/G-stop vehicle speed $V_{th}$. If the speed is less than or equal to the E/G-stop vehicle speed $V_{th}$, the process for this cycle goes forward to Step S202; otherwise, the process for this cycle ends.

At Step S202, the first ECU 10 determines whether a resume command is input by the ACC switch 12. The resume command is typically input by operating the ACC switch 12 to be at a resume position, when the driver wants to resume the operation of the ACC switch after having released the speed setting by stepping on the brake petal or the clutch pedal during a constant traveling under the ACC. Note that, on this occasion, the vehicle speed is gradually accelerated to a speed that has been set before the release. If a resume command is input by the ACC switch 12, the process for this cycle goes forward to Step S204; otherwise, the process for this cycle ends.

At Step S204, the first ECU 10 outputs an S&S prohibition request. The S&S prohibition request is a signal that requests the second ECU 20 not to operate the automatic engine stop function. Note that if having output an S&S prohibition request, the first ECU 10 may continue to output the S&S prohibition request for a certain number of cycles without executing the determination at Step S202 as long as a positive determination is obtained at Step S200.

Note that if the automatic engine stop function operates when acceleration by the preceding vehicle following control function is required, the engine needs to be restarted, which is wasteful. Also, if the engine has already been stopped due to the automatic engine stop function when acceleration by the preceding vehicle following control function is required, the engine needs to be restarted immediately. In this regard, according to the process illustrated in FIG. 2, when the speed is less than or equal to the E/G-stop vehicle speed $V_{th}$, and a resume command is input by the ACC switch, an S&S prohibition request is output. If the S&S prohibition request is output, basically (exceptions will be described later), a state is generated in which the second ECU 20 does not have the automatic engine stop function operate. Therefore, according to the process illustrated in FIG. 2, if acceleration by the preceding vehicle following control function is required while the engine is being stopped due to the automatic engine stop function, it is possible to prohibit the automatic engine stop function from operating, or to restart the stopped engine immediately.

Note that, in the example illustrated in FIG. 2, although the first ECU 10 determines whether the speed is less than or equal to the E/G-stop vehicle speed $V_{th}$ at Step S200, it may determine whether the vehicle speed is less than or equal to a predetermined vehicle speed (≠ the E/G-stop vehicle speed $V_{th}$). This takes a read error difference of the vehicle speed (described later) that may be generated between the first ECU 10 and the second ECU 20, into account. Therefore, the predetermined vehicle speed may be, for example, less than the E/G-stop vehicle speed $V_{th}$ by a predetermined error difference. The predetermined error difference may be determined, for example, depending on the read error difference of the vehicle speed that may be generated between the first ECU 10 and the second ECU 20. Also, from the same viewpoint, at Step S202, the first ECU 10 may determine whether a state continues for a predetermined time or longer during which the vehicle speed is less than or equal to the predetermined vehicle speed.

Also, in the example illustrated in FIG. 2, the first ECU 10 outputs an S&S prohibition request when the vehicle speed is less than or equal to the E/G-stop vehicle speed $V_{th}$, and a resume command is input by the ACC switch. In addition to, or instead of this condition, the first ECU 10 may output an S&S prohibition request when another condition is satisfied. The other condition may be a condition under which acceleration control by the preceding vehicle following control function is expected or executed within a vehicle speed range where the automatic engine stop function may operate.

Figure 3:
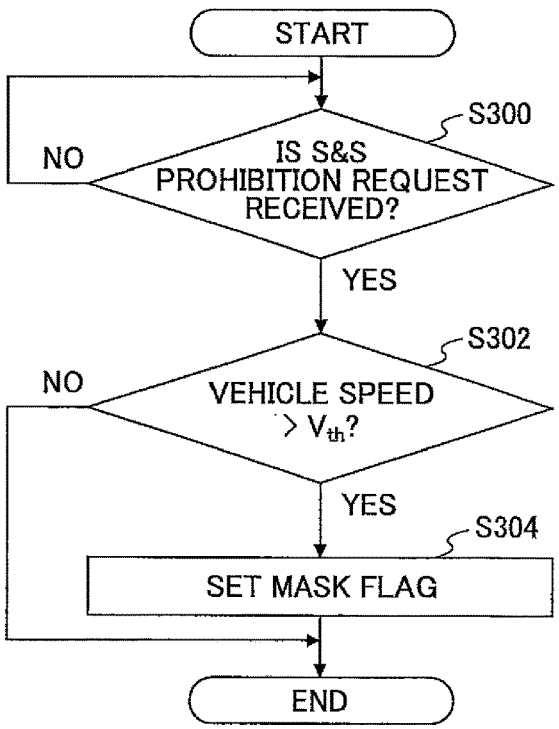
FIG. 3 is a flowchart illustrating an example of a mask flag setting process executed by a second ECU 20.

FIG. 3 is a flowchart illustrating an example of a mask flag setting process executed by the second ECU 20. The process illustrated in FIG. 3 may be an interrupt process that is activated when an S&S prohibition request is received (see Step S300) in a state where an S&S prohibition request flag (described later) is "0" while the ignition switch is turned on.

At Step S300, the second ECU 20 determines whether it receives an S&S prohibition request from the first ECU 10. Namely, the second ECU 20 determines whether an S&S prohibition request is output from the first ECU 10. If receiving an S&S prohibition request from the first ECU 10, the process goes forward to Step S302; otherwise, the process transitions into a state that waits for an output of an S&S prohibition request from the first ECU 10.

At Step S302, based on the latest vehicle speed information, the second ECU 20 determines whether the vehicle speed is greater than the E/G-stop vehicle speed $V_{th}$. If the vehicle speed is greater than the E/G-stop vehicle speed $V_{th}$, the mask flag setting process goes forward to Step S304; otherwise, the mask flag setting process ends for the S&S prohibition request received this time.

At Step S304, the second ECU 20 sets the mask flag to "1". The mask flag is a flag to determine whether an S&S prohibition request from the first ECU 10 is masked where "1" represents a masked state, and "0" represents a non-masked state. The mask flag is reset to "0" when the ignition switch is turned off or on. Once the mask flag is set to "1" during a trip, then, the state where the flag is set to "1" is maintained until the ignition switch is turned off.

According to the process illustrated in FIG. 3, if the vehicle speed is greater than the E/G-stop vehicle speed $V_{th}$ when receiving an S&S prohibition request from the first ECU 10, the mask flag can be set to "1". The S&S prohibition request is output only when the speed is less than or equal to the E/G-stop vehicle speed $V_{th}$ as illustrated in FIG. 2. Therefore, the vehicle speed greater than the E/G-stop vehicle speed $V_{th}$ when receiving an S&S prohibition request from the first ECU 10, implies that an abnormality occurs in the preceding vehicle following control function in some way. Abnormalities of the preceding vehicle following control function include, for example, that the first ECU 10 goes out of control. Therefore, according to the process illustrated in FIG. 3, the mask flag can be set to "1" when an abnormality occurs in the preceding vehicle following control function.

Note that, in the process illustrated in FIG. 3, as a condition to set the mask flag to "1" when receiving an S&S prohibition request from the first ECU 10, it is necessary that the vehicle speed at the moment is greater than the E/G-stop vehicle speed $V_{th}$. However, to take the read error difference of the vehicle speed that could be generated between the first ECU 10 and the second ECU 20 into account, at Step S302, the second ECU 20 may determine whether the vehicle speed is greater than the E/G-stop vehicle speed $V_{th}$ by a predetermined value (>0), and/or, may determine whether a state continues for a predetermined time or longer during which the vehicle speed is greater than the E/G-stop vehicle speed $V_{th}$. Note that the read error difference of the vehicle speed between the first ECU 10 and the second ECU 20 may be generated by a difference of read timings of the vehicle speed signal in a CAN, and such a timing difference may be generated due to a time lag between an output time of an S&S prohibition request from the first ECU 10 and a reception time of the S&S prohibition request at the second ECU 20.

Also, in the process illustrated in FIG. 3, as a condition to set the mask flag to "1" when receiving an S&S prohibition request from the first ECU 10, it is necessary that the vehicle speed at the moment is greater than the E/G-stop vehicle speed $V_{th}$. However, instead of, or in addition to the vehicle speed being greater than the E/G-stop vehicle speed $V_{th}$, one or more other conditions may be added as logical AND conditions or logical OR conditions. In this case, another condition may be an inverse of the output condition of an S&S prohibition request by the first ECU 10. Namely, for a proposition that "if the output condition is satisfied, an S&S prohibition request is output", the other condition may be set that if the contraposition is not true, the mask flag is set to "1".

Figure 4:
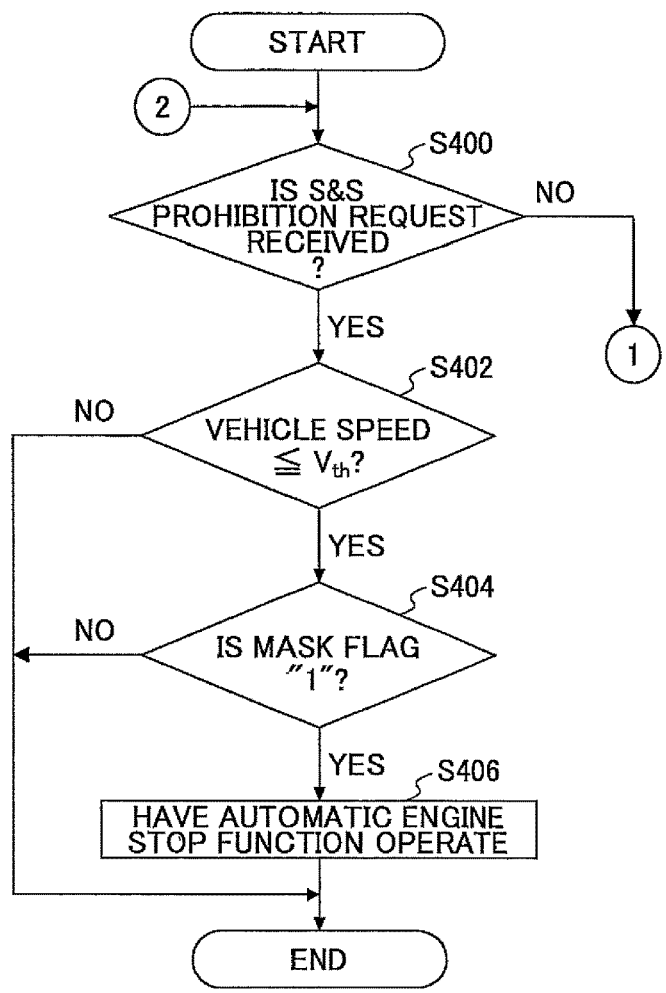
FIG. 4 is a flowchart illustrating an example of an operational method of an automatic engine stop function when receiving an S&S prohibition request from the first ECU 10, while the automatic engine stop function does not operate.

FIG. 4 is a flowchart illustrating an example of an operational method of the automatic engine stop function when receiving an S&S prohibition request from the first ECU 10. The process illustrated in FIG. 4 may be repeatedly executed for predetermined cycles when the automatic engine stop function does not operate (the engine operates), while the ignition switch is turned on.

At Step S400, the second ECU 20 determines whether it receives an S&S prohibition request from the first ECU 10. Namely, the second ECU 20 determines whether an S&S prohibition request is output from the first ECU 10. If receiving an S&S prohibition request from the first ECU 10, the process goes forward to Step S402; otherwise, the process goes forward to FIG. 5 which will be described later.

At Step S402, based on the latest vehicle speed information, the second ECU 20 determines whether the speed is less than or equal to the E/G-stop vehicle speed $V_{th}$. If the speed is less than or equal to the E/G-stop vehicle speed $V_{th}$, the process for this cycle goes forward to Step S404; otherwise, the process for this cycle ends.

At Step S404, the second ECU 20 determines whether the mask flag is set to "1". If the mask flag is set to "1", the process for this cycle goes forward to Step S406; or if the mask flag is not set to "1" (namely, the mask flag is set to "0"), the process for this cycle ends.

At Step S406, the second ECU 20 has the automatic engine stop function operate under conditions that the other S&S start conditions are satisfied. If the other S&S start conditions are not satisfied, the process for this cycle ends. Whether the other conditions are satisfied may be determined at Step S402, or conversely, the condition at Step S402 may be determined at Step S406 as the other conditions. When a state is formed where the engine stops by the operation of the automatic engine stop function, the process in FIG. 6 starts, which will be described later.

According to the process illustrated in FIG. 4, if the mask flag is set to "0" when receiving an S&S prohibition request from the first ECU 10, the second ECU 20 does not go forward to Step S406, and does not have the automatic engine stop function operate. Thus, when an abnormality does not occur in the preceding vehicle following control function, the automatic engine stop function is prohibited in response to an S&S prohibition request from the first ECU 10. On the other hand, if the mask flag is set to "1" when receiving an S&S prohibition request from the first ECU 10, the second ECU 20 goes forward to Step S406, and has the automatic engine stop function operate under conditions that the other S&S start conditions are satisfied. Thus, when an abnormality occurs in the preceding vehicle following control function, an S&S prohibition request from the first ECU 10 can be masked to have the automatic engine stop function operate.

Incidentally, when the first ECU 10 have a self-abnormality detection function to detect by itself that an abnormality occurs in the preceding vehicle following control function, and if detecting by itself that an abnormality occurs in the preceding vehicle following control function, the first ECU 10 can stop the preceding vehicle following control function so that an S&S prohibition request is not output.

However, if an abnormality occurs that cannot be detected by such a self-abnormality detection function (for example, the first ECU 10 goes out of control), an S&S prohibition request may be unnecessarily output. This is the same for a case where the first ECU 10 does not have a self-abnormality detection function. In such a case, an unnecessary S&S prohibition request from the first ECU 10 may reduce operational occasions of the automatic engine stop function, and effects of the automatic engine stop function (fuel efficiency and emission reduction) may not be sufficiently exhibited.

In contrast to this, according to the process illustrated in FIG. 4, as described above, when an abnormality occurs in the preceding vehicle following control function, an S&S prohibition request from the first ECU 10 can be masked on the second ECU 20 side, to continue a state where the automatic engine stop function can operate. Thus, inconvenience can be reduced that could be caused by outputting an S&S prohibition request when an abnormality occurs in the preceding vehicle following control function, and the effects of the automatic engine stop function (fuel efficiency and emission reduction) can be maintained.

Figure 5:
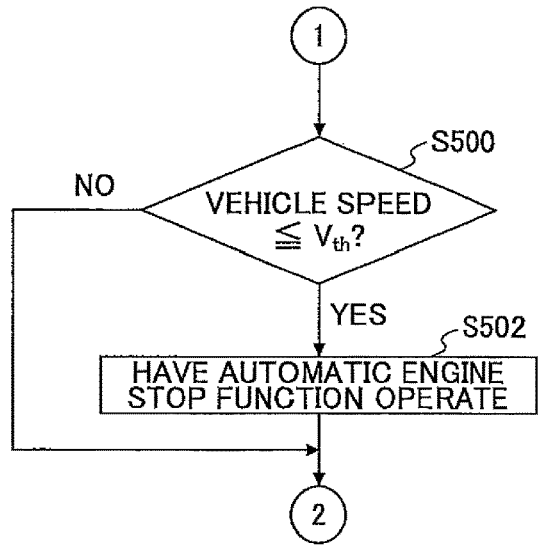
FIG. 5 is a flowchart illustrating an example of an operational method of an automatic engine stop function when not receiving an S&S prohibition request from the first ECU 10, while the automatic engine stop function does not operate.

FIG. 5 is a flowchart illustrating an example of an operational method of the automatic engine stop function when not receiving an S&S prohibition request from the first ECU 10.

At Step S500, based on the latest vehicle speed information, the second ECU 20 determines whether the speed is less than or equal to the E/G-stop vehicle speed $V_{th}$. If the speed is less than or equal to the E/G-stop vehicle speed $V_{th}$, the process for this cycle goes forward to Step S502; otherwise, the process in FIG. 4 starts from the next cycle.

At Step S502, the second ECU 20 has the automatic engine stop function operate under conditions that the other S&S start conditions are satisfied. Note that if the other S&S start conditions are not satisfied, the process in FIG. 4 starts from the next cycle. Whether the other S&S start conditions are satisfied may be determined at Step S500, or conversely, the condition at Step S500 may be determined at Step S502 as the other S&S start conditions. When a state is formed where the engine is stopped by an operation of the automatic engine stop function, the process in FIG. 6 starts, which will be described later.

Note that although the processes illustrated in FIG. 4 and FIG. 5 are described separately for the sake of explanation, these processes may be integrated.

Figure 6:
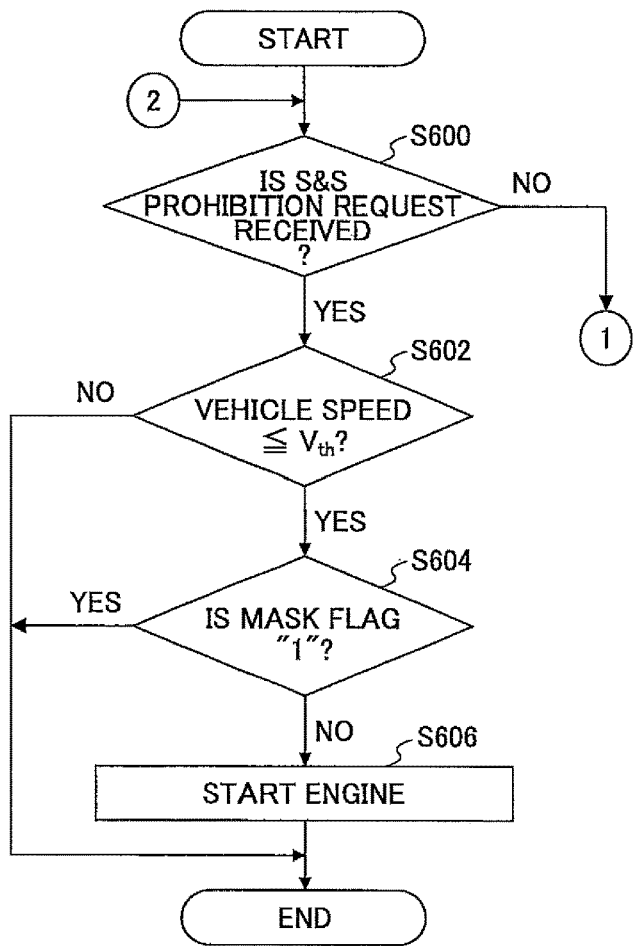
FIG. 6 is a flowchart illustrating an example of an operational method of an automatic engine stop function when receiving an S&S prohibition request from the first ECU 10, while the automatic engine stop function operates.

FIG. 6 is a flowchart illustrating an example of an operational method of the automatic engine stop function when receiving an S&S prohibition request from the first ECU 10, while the automatic engine stop function operates. The process illustrated in FIG. 6 may be repeatedly executed for predetermined cycles when the automatic engine stop function operates (the engine stops), while the ignition switch is turned on.

Steps S600 to S604 may be the same as Steps S400 to S404 illustrated in FIG. 4. However, if the mask flag is set to "0" at Step S604, the process goes forward to Step S606; or if the mask flag is set to "1", the process for this cycle ends.

At Step S606, the second ECU 20 stops the operation of the automatic engine stop function. Having completed Step S606, the process in FIG. 4 starts for the next cycle.

According to the process illustrated in FIG. 6, if the mask flag is set to "0" when receiving an S&S prohibition request from the first ECU 10, the second ECU 20 goes forward to Step S606, and stops the operation of the automatic engine stop function. Thus, when an abnormality does not occur in the preceding vehicle following control function, the engine can be promptly restarted in response to an S&S prohibition request from the first ECU 10. On the other hand, if the mask flag is set to "1" when receiving an S&S prohibition request from the first ECU 10, the second ECU 20 does not go forward to Step S606, and does stop the operation of the automatic engine stop function. Thus, when an abnormality occurs in the preceding vehicle following control function, an S&S prohibition request from the first ECU 10 can be masked to have the automatic engine stop function operate.

Figure 7:
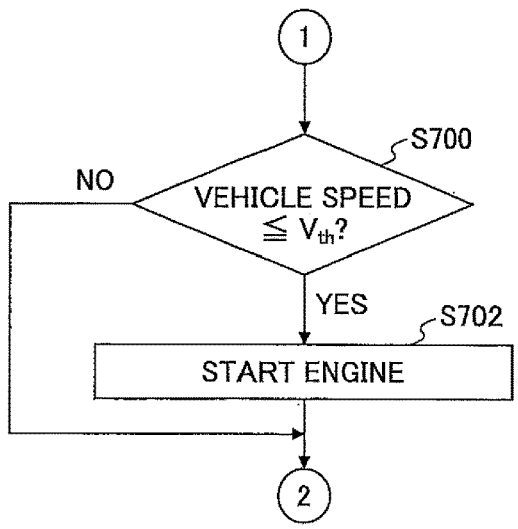
FIG. 7 is a flowchart illustrating an example of an operational method of an automatic engine stop function when not receiving an S&S prohibition request from the first ECU 10, while the automatic engine stop function operates.

FIG. 7 is a flowchart illustrating an example of an operational method of the automatic engine stop function when not receiving an S&S prohibition request from the first ECU 10, while the automatic engine stop function operates.

Step S700 may be the same as Step S500 illustrated in FIG. 5. However, If the speed is less than or equal to the E/G-stop vehicle speed $V_{th}$, the process for this cycle goes forward to Step S702; otherwise, the process in FIG. 6 starts from the next cycle.

At Step S702, the second ECU 20 stops the operation of the automatic engine stop function under conditions that the predetermined S&S end conditions are satisfied. Note that if the other S&S end conditions are not satisfied, the process for this cycle ends, and the process in FIG. 6 starts from the next cycle. The predetermined S&S end conditions may be as described above. If stopping the operation of the automatic engine stop function, the process in FIG. 4 starts from the next cycle.

Note that although the processes illustrated in FIG. 6 and FIG. 7 are described separately for the sake of explanation, these processes may be integrated.

As above, the embodiments have been described in detail. Further, the present invention is not limited to these embodiments, but various variations and modifications may be made without departing from the scope of the present invention. Also, all or multiple elements in the above embodiments may be combined.

For example, in the embodiments described above, although the mask flag is reset for each trip, the reset timing of the mask flag may be arbitrary. For example, the mask flag may be reset once in multiple trips, may be reset when a predetermined time or a predetermined distance has passed, or may be reset when a predetermined reset input is received.

DESCRIPTION OF REFERENCE SYMBOLS 1 vehicle control apparatus
10 first ECU
12 ACC switch
20 second ECU The present application is based on and claims the benefit of priority of Japanese Priority Application No. 2014-120997 filed on Jun. 11, 2014, with the Japanese Patent Office, the entire contents of which are hereby incorporated by reference.

The invention claimed is:
1. A vehicle control apparatus, comprising:
a first control unit configured to include a preceding vehicle following control function to control vehicle speed, based on a traveling state of a preceding vehicle, and to output a prohibition request to an automatic engine stop function; and
a second control unit configured to include the automatic engine stop function, and to maintain the automatic engine stop function, contrary to the prohibition request output from the first control unit, when an abnormality occurs in the preceding vehicle following control function, wherein the first control unit outputs the prohibition request when executing acceleration control in a state where the vehicle speed is less than or equal to a predetermined vehicle speed, wherein the second control unit detects the abnormality in the preceding vehicle following control function in a case where the vehicle speed becomes greater than the predetermined vehicle speed after the prohibition request has been output from the first control unit, and sets a flag to mask a prohibition request to be output by the first control unit after the abnormality has been detected.

2. The vehicle control apparatus, as claimed in claim 1, wherein when the prohibition request is output from the first control unit when the abnormality occurs in the preceding vehicle following control function, the second control unit has the automatic engine stop function operate when a predetermined condition is satisfied.

* * * * *